United States Patent

[11] 3,572,693

[72] Inventors Curtis A. Larson;
Donald J. Wanek, Rochester, Minn.

[21] Appl. No. 786,167
[22] Filed Dec. 23, 1968
[45] Patented Mar. 30, 1971

[73] Assignee International Business Machines Corporation
Armonk, N.Y.

[54] CARD STOP-REGISTRATION DEVICE
8 Claims, 11 Drawing Figs.

[52] U.S. Cl. .......... 271/60, 271/57, 271/36
[51] Int. Cl. .......... B65h 9/06
[50] Field of Search .......... 271/50, 53, 60, 58

[56] References Cited
UNITED STATES PATENTS

| | | | |
|---|---|---|---|
| 2,677,542 | 5/1954 | Backhouse et al. .......... | 271/50X |
| 3,356,364 | 12/1967 | Grigereit .......... | 271/60 |

*Primary Examiner*—Evon C. Blunk
*Assistant Examiner*—Joseph Wegbreit
*Attorney*—Hanifin and Jancin

ABSTRACT: A document card positioning mechanism for accurately locating a moving document card at a predetermined station in its path of movement including a card stop movable into engagement with a stationary plate defining one boundary of the path of card movement with the stop having a slanted surface on which the leading edge of the card abuts, and a pivoted wedge element movable out of the path of card movement by the card as it passes along said path toward said stop and movable back into the path of card travel so as to wedge against the trailing edge of the card and hold it forcefully in engagement with the slanted stop surface.

Patented March 30, 1971 3,572,693

3 Sheets-Sheet 1

INVENTOR.
CURTIS A. LARSON
DONALD J. WANEK
BY Keith T. Bleuer
ATTORNEY

CARD STOP-REGISTRATION DEVICE

The invention relates to transport mechanisms for document cards and more particularly to card positioning devices for receiving moving cards and for stopping them at a station so as to permit a subsequent operation, such as perforation, to be performed thereon.

Document card processing machines have heretofore been used wherein the cards are fed from a hopper and are transported in a certain path to a station at which the cards are stopped momentarily so as to permit an operation, such as perforation, to be performed on the cards. Selectively operable stopping devices have been used for bringing the cards to a halt at the operating station, and these have included card stops that move across the card path. Difficulties have been had, particularly when the cards are moving at high speeds in their path, in obtaining accurate stoppage of the cards in a certain predetermined position, due to the fact that the cards tend to rebound from the stops so that the actual rest positions of the cards varies.

It is an object of the present invention to provide an improved card transport device and more particularly an improved card stopping and retaining mechanism by means of which a document card may be stopped in its path of travel in an accurately predetermined position. More particularly, it is an object of the present invention to provide such a card stopping mechanism which includes a stop that blocks a card in its travelled path and additional mechanism effective to apply force on the trailing edge of the card for holding the card against the card stop, once the leading edge of the card has made contact with the stop.

In general, a preferred embodiment of the invention comprises spaced plates that define a portion of a path of card movement in the gap between the plates and to which cards may be fed one at a time from a card hopper. A stop is provided that is engageable with one of the plates so as to provide a card stopping action; and the stop includes an electromagnet, and the plate with which the stop engages is of ferrous material so that the engagement of the stop with the plate is attained by energizing the electromagnet. In case the operation to be performed on the card in its stationary position determined by the stop is a perforating, the plate with which the stop engages may have punch rods extending through it; and the other plate may have die openings formed in it to receive the punch rods so that a perforating action is attained when the punch rods move across the gap into their die openings. In order to prevent rebound of a card from the stop, a wedging element is provided in the path of card travel between the hopper and the stop, and the wedge element is so constructed and arranged as to fall behind a card as it passes into contact with the stop so as to wedge the card between the stop and the wedging element to hold the card in an accurately predetermined position. Preferably, the wedge element is a pivotally mounted element having eccentric card camming surfaces on its forward end; and a spring is provided for yieldably urging the wedge element to a card wedging position. The invention consists of the novel constructions, arrangements and devices to be hereinafter described and claimed for carrying out the above stated objects and such other objects, as will be apparent from the following description of a preferred embodiment of the invention, illustrated with reference to the accompanying drawings, wherein:

Figures 1, 2:
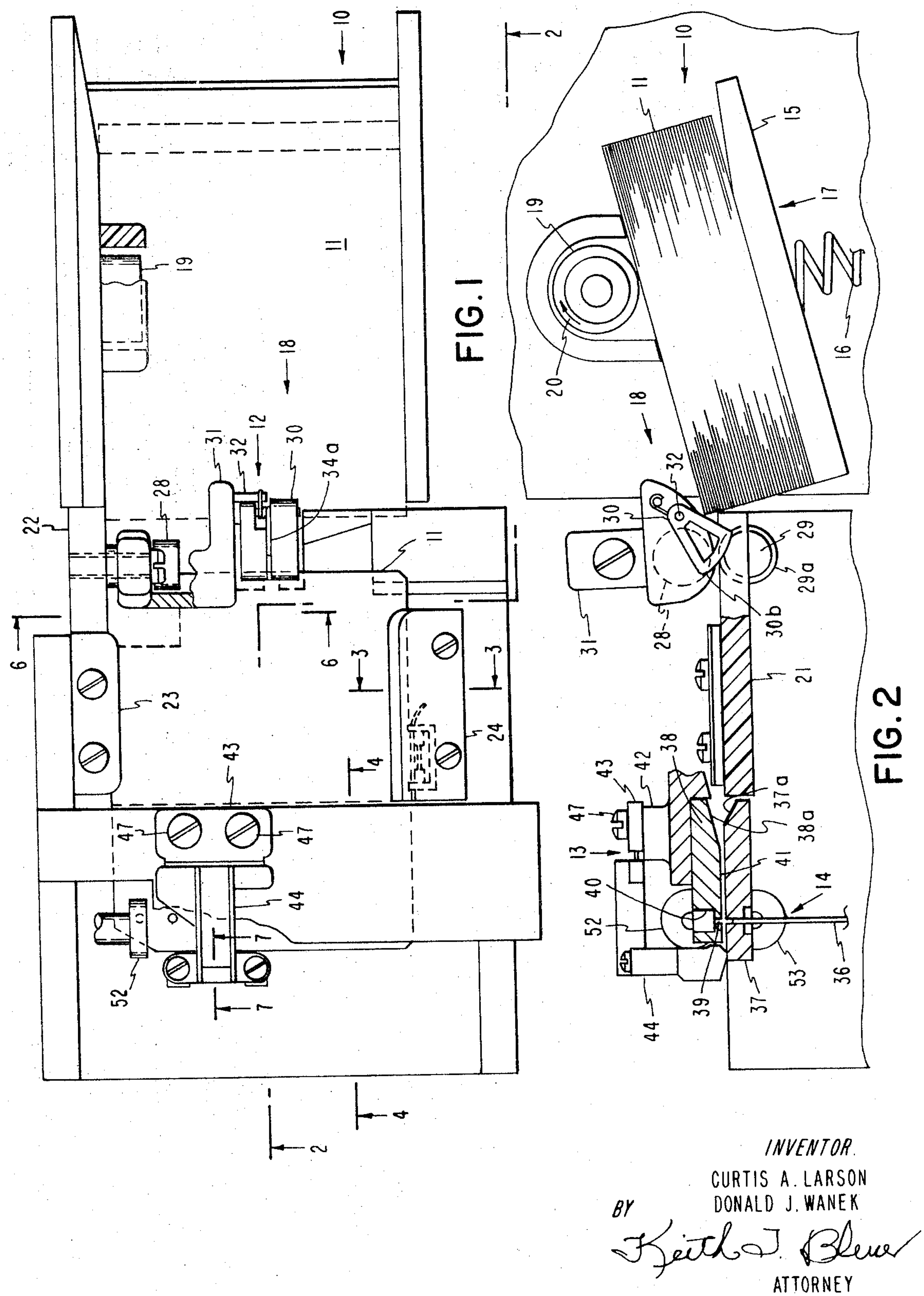
FIG. 1 is a plan view of a transport mechanism incorporating the principles of the invention.
FIG. 2 is a view partially in section and partially in side elevation taken from line 2–2 of FIG. 1.
Figure 4:
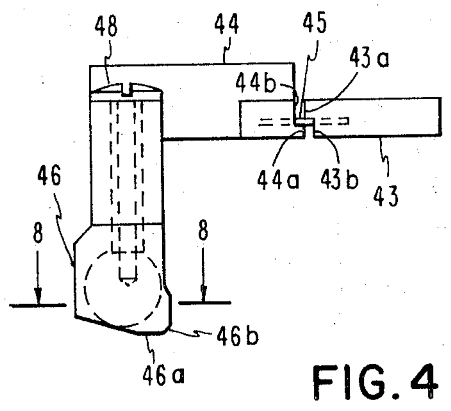
FIG. 4 is a side elevational view on an enlarged scale of a card stop device incorporated in the transport mechanism and taken from line 4–4 of FIG. 1.
Figure 8:
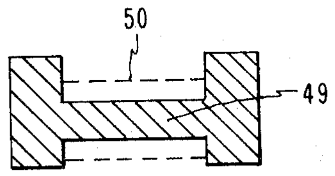
Figures 9, 10, 11:
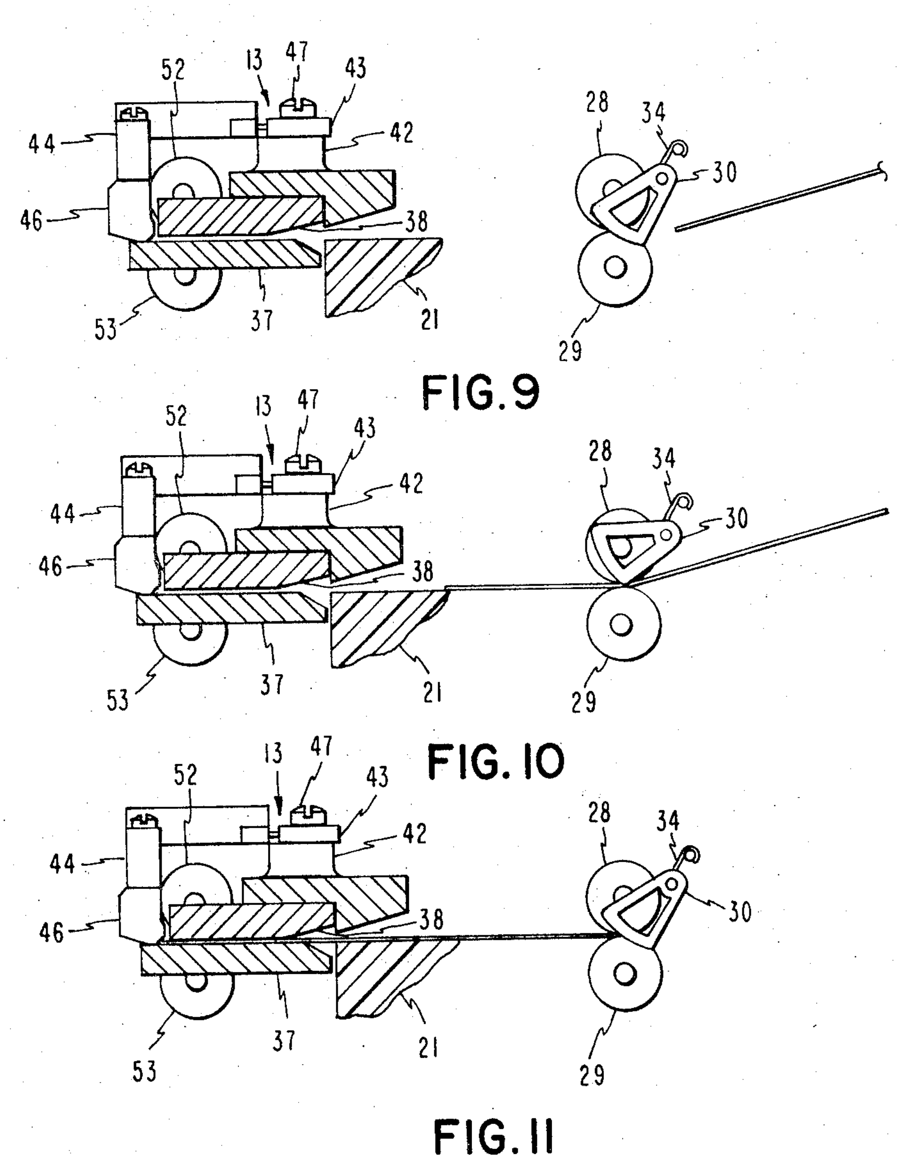

FIG. 8 is also a sectional view of this part of the card stop device and taken from line 8–8 of FIG. 4; and FIGS. 9, 10, and 11 are schematic side elevational views of the transport mechanism. Like characters of reference designate like parts in the several views. Referring now to the drawings, and in particular to FIGS. 1 and 2, the illustrated transport mechanism may be seen to comprise, in general, a hopper 10 for a stack of document cards 11, a card pusher or wedging device 12, a card stop device 13, and a punch mechanism 14.

The hopper 10 includes a plate 15 which carries the stacked cards 11 and which is biased upwardly by any suitable mechanism, such as by a coil spring 16 acting in the direction of the arrow 17. It will be noted that the support plate 15 is inclined slightly downwardly (to the left as seen in FIG. 2), and the stacked cards 11 are likewise inclined in this direction. The cards 11 are fed from the hopper 10 in the direction indicated by the arrows 18 shown in FIGS. 1 and 2, and this is accomplished in the illustrated embodiment by a friction pick roll 19 which continuously rotates in the direction indicated by the arrow 20. The roll 19 is movable vertically by any suitable mechanism (not shown) into and out of contacting relation with the uppermost card 11 of the stack of cards carried by the plate 15.

Figure 3:
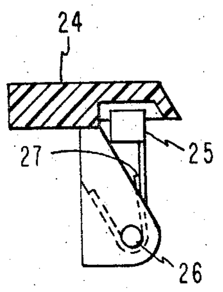
FIG. 3 is a sectional view on an enlarged scale taken on line 3–3 of FIG. 1.

A card carrying plate 21 is located between the hopper 10 and the card stop mechanism 13. The plate 21 is shown to be substantially horizontal and is so positioned that, as the uppermost card 11 from the card stack is moved in the direction indicated by the arrows 18 in FIGS. 1 and 2, the leading edge of the cards makes contact with the upper surface of the plate 21; and the card bends so that the card eventually lies flat on top of the plate 21. The plate 21 is provided with a registration rail 22 on one edge, and a cover 23 is disposed on the rail 22 and extends over the plate 21. A cover 24 is disposed at the other edge of the plate 21, and a finger 25 is disposed beneath and carried by the cover 24. The finger 25 is pivotally mounted on a shaft 26, an a spring 27 (see FIG. 3) surrounds the shaft 26 and has its ends respectively in contact with the finger 25 and with a portion of the cover 24 so as to yieldably urge the finger 25 inwardly toward the plate 21. The spring 27 is so constructed as to provide only a weak force from the finger 25 on a document card 11 positioned on the plate 21 just sufficient to hold a card 11 in registration with the registration rail 22 yet allowing the card 11 to be moved onto the plate 21 with a rapid motion.

A pair of feed rolls 28 and 29 are provided adjacent one end of the registration rail 22 for feeding the cards 11 onto the plate 21. The lowermost feed roll 29 is continuously driven by any suitable driving mechanism (not shown); and the rolls 28 and 29 are positioned very closely together such as, for example, with a gap of 0.002 to 0.004 inch. The roll 29 has a resilient rim 29*a* on its periphery; and the gap between the rolls 28 and 29 is somewhat less than the thickness of a document card 11 which may be, for example, 0.006 to 0.007 inch.

Figure 5:
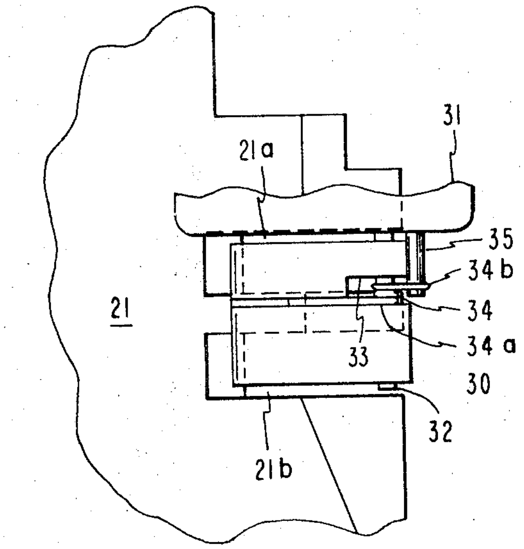
FIG. 5 is a partial plan view of the transport mechanism taken on an enlarged scale with respect to that of FIG. 1.
Figure 6:
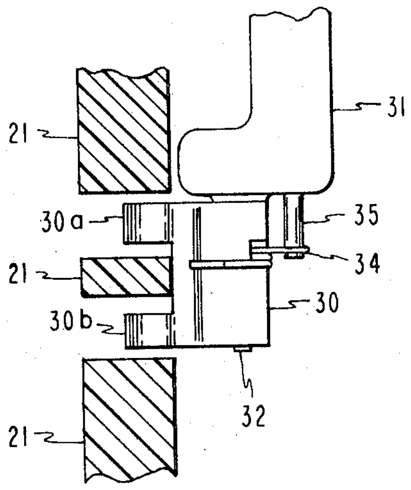
FIG. 6 is an end view on an enlarged scale of a wedge element in the transport mechanism and taken from line 6–6 of FIG. 1.
Figure 7:
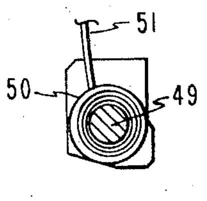
FIG. 7 is a sectional view on an enlarged scale of a part of the card stop device and taken from line 7–7 of FIG. 1.

The card pusher device 12 comprises a cam or wedge element 30 (see FIGS. 1, 2, 5 and 6) which is pivotally mounted with respect to a fixed bracket 31 by means of a shaft 32 on which the element 30 is disposed. The wedge element 30 extends into slots 21*a* and 21*b* (see FIG. 5) formed in the end of the plate 21 and has cam or wedging surfaces 30*a* and 30*b* (see FIG. 6) within these slots. It will be noted from FIG. 2 in particular that the shaft 32 is located at the higher level than the plate 21; and the cam surfaces 30*a*and 30*b* are cylindrical, being formed from a center located at a still higher a; than the shaft 32 to be eccentrically disposed with respect to the center of rotation of the element 30. Thus, as the cam element 30 pivots downwardly as shown in FIG. 2, the cam surfaces 30*a* and 30*b* at the level of the upper surface of the plate 21, move closer to the adjacent ends of the slots 21*a* and 21*b* which define ends of the card carrying plate 21.

The cam element 30 is provided with a slot 33 (see FIG. 5) in it surrounding the shaft 32, and a coil spring 34 is disposed in the slot 33 and surrounds the shaft 32. One end 34*a* of the spring 34 overlies the upper surface of the cam element 30, and the other end of the spring 34*b* is looped about a pin 35 which is fixed with respect to the bracket 31. It will be noted that the bracket 31 is so positioned as to hold the cam element 30 substantially midway between the sides of the plate 21 looking in the direction indicated by the arrows 18.

The punch mechanism 14 comprises a plurality of punch rods 36 disposed in a row. The punch rods 36 extend through a stripper plate 37 and are reciprocated upwardly by any suitable mechanism (not shown). A die plate 38 is located above the stripper plate 37, and the die plate 38 has a plurality of die holes 39 located in it for receiving the punch rods 36. The holes 39 are in communication with a chip receiving slot 40 provided in the upper surface of the die plate 38. A gap 41 is provided between the plates 37 and 38, and the upper surface of the stripper plate 37 is in alignment with the upper surface of the plate 21. The stripper plate 37 is chamfered at 37*a; and the die plate 38 is chamfered at 38a*, so as to provide an outwardly tapering slot between the plates 37 and 38 for receiving cards 11 that are fed from the plate 21 into the gap 41.

Both of the plates 37 and 38 are fixed by any suitable supporting and connecting structure with respect to the plate 21, and a cover 42 is disposed on top of the die plate 38.

The card stop device 13 comprises a mounting portion 43 (see FIGS. 1, 2 and 4), an arm portion 44 connected to the mounting portion 43 by means of a leaf 45 of spring material, such as resilient sheet steel embedded in the portions 43 and 44, and a stop block 46. The mounting portion 43 is fixed on the upper surface of the cover 42 by a pair of screws 47. The stop block 46 is fixed on a lower surface of the arm portion 44 by means of a pair of screws 48 which extend through the arm portion 44 and into the stop block 46. It will be noted that the arm portion 44 overlies the die plate 38 and that the stop block 46 is positioned adjacent the end of the die plate 38 which has a punch receiving holes 39 therein.

The stop block 46 comprises a center shaft portion 49 and an electric coil 50 which has a pair of leads 51 and is disposed on the shaft portion 49. The arrangement of the arm portion 44, the stop block 46, and the leaf 45 are such that a lower surface 46*a* of the stop block 46 is held with a slight spring pressure against the upper surface of the stripper plate 37 with the electric coil being deenergized. It will be noted from FIG. 4 that the forward edge 43*a* of the mounting portion 43 which overlies the leaf 45 is substantially in line with the rear edge 44*a* of the arm portion 44 which underlies the leaf 45. The purpose of this construction is to cause the leaf 45 to bend for the substantial length extending forwardly of the edge 43*a* to the adjacent surface 44*b* of the arm portion 44 for upward movements of the arm portion 44 and to bend for the substantial length of the leaf 45 extending rearwardly from the edge 44*a* to the adjacent surface 43*b* of the mounting portion 43 for downward movements of the arm portion 44 so that bending of the leaf 45 is not localized along a particular bend line and so as to prevent subsequent rupture along such a line. The stop block 46 is provided with a lower surface 46*b* which is chamfered with respect to the surface 46*a* and extends at substantially a 45° angle with respect to the surface 46*a*.

A pair of card incrementing rolls 52 and 53 are provided on one side of the card stop mechanism 13. The lowermost incrementing roll 53 is continuously driven in increments or predetermined fractional parts of a revolution by any suitable driving mechanism (not shown), and the uppermost incrementing roll 52 is freely rotatable and is movable upwardly and downwardly by any suitable roll moving mechanism (not shown) so as to move into and out of a pressure nip relationship with the roll 53.

In operation, individual cards 11 are fed downwardly from a position in the hopper 10 as shown in FIG. 9 into position on the plate 21 as shown diagrammatically in FIG. 10. This movement of the individual cards is due to the action of the roll 19 which is moved downwardly onto the upper card 11 of the stack in the hopper 10 when it is desired that a card 11 be so fed onto the plate 21. In moving onto the plate 21, a card 11 also moves between the rolls 28 and 29.

Each card 11, as it moves onto the plate 21, makes contact with the wedge element 30 and rotates the wedge element 30 in a clockwise direction, as shown in FIG. 10, against the action of the spring 34. The feed rolls 28 and 29 cause the card to continue in its movement lengthwise of the plate 21 so that the card enters the gap 41 and moves against the slanted surface 46*b* of the stop block 46. The coil 50, at this time, is energized due to electric current being applied to it through the leads 51; and the stop block 46 is thus held quite tightly in engagement with the stripper plate 37. The striper plate 37 is of ferrous material so that a magnetic circuit is completed through the coil 50 and the stripper plate 37 for this purpose. As the card moves toward and against the slanted surface 46*b* of the stop block 46, the cam member 30 rotates counterclockwise as seen in FIG. 11 under action of the spring 34; and the cam surfaces 30*a* and 30*b* abut the trailing edge of the card and hold the card in engagement with the slanted surface 46*b* of the stop block 46. As the card initially contacts the slanted surface 46*b*, the card may rebound back against the cam member 30; however, the cam member 30, in moving counterclockwise, provides a positive force on the cards sufficient to reposition and hold the card against the slanted surface 46*b* so as to accurately locate the card.

The roll 52 is in raised position when the card 11 is so moved onto the plate 21; and, upon contact of the card 11 with the slanted surface 46*b*, the roll 52 is lowered onto the card 11 so as to pinch the card between the rolls 52 and 53. This downward movement of the roll 52 is made between incrementing movements of the roll 53; and, upon completion of the downward movement of the roll 52, the coil 50 is deenergized. On the next incremental movement of the roll 53, the card is thus given an incremental forward movement which causes its leading edge to move underneath the stop block 46, raising the stop block 46 from the surface of the stripper plate 37 by virtue of the action of the leading edge of the card on the slanted surface 46*b*.

After this incremental movement of the card, and while the rolls 52 and 53 are momentarily stationary between incremental movements of the roll 53, one or more of the punch rods 36 are reciprocated upwardly so as to punch openings through the card in predetermined positions in a first column. Subsequently, after downward reciprocation of the punch rods 36, with the stripper plate 37 functioning to strip the card from the downward moving punch rods 36 that have performed the punching action, the rolls 52 and 53 incrementally rotate again to increment the card to a second position, with the card moving forwardly beneath the stop block 46; and, after this incremental movement of the card, selected ones of the punch rods 36 are reciprocated to punch holes through the document card in a second column. Additional columns of holes are subsequently punched into the card, after additional such incremental movements of the card caused by the incrementing rolls 52 and 53, by additional reciprocations of the punch rods 36. After the card 11 has passed incrementally through the number of positions to be punched and has passed outwardly from beneath the stop block 46, the incrementer roll 52 is raised so as to allow a subsequent card 11 to come into its initial position in contact with the slanted surface 46*b*.

The wedge element 30, in dropping from an upper position as seen in FIG. 10 caused by a card passing beneath the element 30, to a lower position as seen in FIG. 11 as the card passes into contact with the slanted surface 46*b*, has its cam portions 30*a* and 30*b* bearing on the trailing edge of the card and camming the card forwardly against the tapered portion 46*b* of the stop block 46 so as to wedge the card into a fixed initial position. The wedge element 30 thus functions to prevent the card from rebounding off the slanted surface 46*b* and coming to rest in a position other than a proper initial position in contact with the slanted surface 46*b*. The wedge element 30, in descending, actually holds the card under pressure against the slanted surface 46*b;* and the cam surfaces 30*a* and 30*b* and also the slanted surface 46*b* have wedging actions with respect to the card so as to accurately position it.

In this connection, it should be noted that the spring 27, effective on the finger 25, is so weak that the finger 25 does not substantially impede a card 11 from moving to its position in contact with the slanted surface 46*b* under the action of the feed rolls 28 and 29; but, the spring 27 is sufficiently strong that the finger 25 holds a document card 11 in contact with the registration rail 22. The cam surfaces 30*a* and 30*b* and the slanted surface 46*b* thus locate a document card longitudinally; and the finger 25, acting with the rail 22, functions to locate the card transversely so that the card 11 is located in a proper fixed initial position both longitudinally and transversely for subsequent accurate punching.

The resiliency of the leaf 45, which connects the base portion 43 with the arm portion 44 of the card stop mechanism 13, causes the stop block 46 to fall off of a previous card 11, which has had the punching action completed on it, and onto the upper surface of the stripper plate 37 so that the stop block 46 is in a proper position to make a magnetic circuit with the stripper plate 37 when the coil 50 is reenergized just prior to a subsequent card 11 being moved forwardly by means of the rolls 28 and 29.

The stop block 46, in conjunction with the coil 50 wound thereon, constitutes an electromagnet which, when energized, in effect increases the spring rate holding the stop block 46 in firm contact with the stripper plate 37, augmenting the action of the spring leaf 45 and assuring that, under ordinary circumstances, the card cannot proceed beyond the stop block 46 and, in particular, beyond its slanted surface 46*b*. If, for some reason, there may be a malfunction of the machine, with the roll 52 being lowered and in driving engagement with a card between the rolls 52 and 53 and with the coil 50 being energized, in this case the slanted surface 46*b* of the stop block 46 functions to raise the stop block 46 with respect to the stripper plate 37 so as to allow passage of a card beneath the stop block 46 rather than allowing the card to become distorted, bent, or torn. The slanted surface 46*b* thus functions in a safety capacity under these circumstances.

The card stop mechanism 13, including the electrically controlled stop block 46 with the slanted card stopping surface 46*b* thereon, and acting in conjunction with the wedge element 30 thus advantageously functions to accurately position a document card 11 in a certain position so that columns can be punched in a card in very accurately located positions. The wedge element 30, in rotating counterclockwise as seen in FIG. 11 under the action of the spring 34, due to the eccentrically disposed cam surfaces 30*a* and 30*b* in particular, has the function of forcing the document card 11 into firm engagement with the stop block 46. The slanted portion 46*b* of the stop block 46 advantageously functions to wedge the card 11 firmly against the stripper plate 37 under these conditions, and it also functions as a type of ramp in raising the stop block 46 from the surface of the stripper plate 37 after such accurate locating of a card 11 in an initial position. During subsequent punching, the stop block 46 is held with only slight force against the document card 11 being fed beneath the stop block 46 due to the spring leaf 45; and the stop block 46 is thus a passive element under these circumstances. Due to the fact that there are two wedging surfaces 30*a* and 30*b* provided on the wedge element 30, advantageously a substantial length of the trailing edge of a card 11 is acted on by the element 30 for preventing any damage to the trailing edge of the card. The illustrated mechanism, in addition, advantageously constitutes a low-cost, relatively simple mechanism for accurately positioning a card in an initial position and is advantageously unrelated to other card transport devices either before, or subsequent to, the punch mechanism 14 in the full travel of a card 11.

It is to be understood that the invention is not to be limited to the specific constructions and arrangements shown and described, except only insofar as the claims may be so limited, as it will be apparent to those skilled in the art that changes may be made without departing from the principles of the invention.

We claim:

1. Card transport mechanism comprising:
card guide means for guiding a card so that it moves in a predetermined path;
a card stop in said path effective on the leading edge of the card so as to stop the card at a predetermined position in said path as the card moves forwardly in said path;
a wedge element in said path movable mounted so that the element is moved from an initial position in said path by the card as the card passes forwardly along said path, said wedge element having a wedging surface movable in a direction toward said stop at the level of the card in said path as the wedge element moves toward its initial position in said path after the card has passed the wedge element in its forward movement for wedging against the trailing edge of the card to hold the card firmly against said stop in said predetermined position of the card, said path being defined adjacent said card stop by a pair of plates having a gap between them through which cards travel in said path toward said stop, and said stop engaging one of said plates to be effective; and
means for selectively engaging and releasing said stop with respect to said last-named plate to cause the stop to be effective on a card or to allow the card to pass beyond the stop.

2. Card transport mechanism as set forth in claim 1, said stop including an electromagnet and said plate with which the stop engages being formed of ferrous material so that the stop may engage said last-named plate on energization of the electromagnet to render the stop effective.

3. Card transport mechanism comprising:
card guide means for guiding a card so that it moves in a predetermined path;
a card stop in said path effective on the leading edge of the card so as to stop the card at a predetermined position in said path as the card moves forwardly in said path; and
a wedge element in said path movably mounted so that the element is moved from an initial position in said path by the card as the card passes forwardly along said path, said wedge element having a wedging surface movable in a direction toward said stop at the level of the card in said path as the wedge element moves toward its said initial position in said path after the card has passed the wedge element in its forward movement for wedging against the trailing edge of the card to hold the card firmly against said stop in said predetermined position of the card, said card path being partially defined by a plate located adjacent said card stop and said card stop being engageable with said plate, said card stop being provided with a surface tapering outwardly away from the surface of said plate contacted by the stop so as to provide a wedging action for the forward edge of the card tending to hold the card on said plate as the card moves into contact with the stop.

4. Card transport mechanism as set forth in claim 3, said stop including an electromagnet and said plate with which the stop engages being formed of ferrous material so that the stop may engage said plate on energization of the electromagnet to render the stop effective.

5. Card transport mechanism comprising:
card guide means for guiding a card so that it moves in a predetermined path;
a card stop in said path effective on the leading edge of the card so as to stop the card at a predetermined position in said path as the card moves forwardly in said path; and
a wedge element movably mounted so that the element may move through said path from an initial position outside of said path and having a wedging surface extending at an acute angle with respect to the card in said path so that said wedging surface wedges against the trailing edge of the card as said wedge element moves through said path to thereby wedge the card between the wedge element and said stop and hold it in said predetermined position, said wedge element being movable out of said path into its said initial position by a card passing forwardly along the path and the card allowing the wedge element to move through said path and wedge the card as aforesaid when the card passes beyond the wedge element.

6. Card transport mechanism as set forth in claim 5, said wedge element being pivotally mounted on a pivot located above said path and said wedging surface being a rounded forward surface on the wedge element which is effective on the trailing edge of the card when the wedge element rotates through said path after passage of the card beyond the wedge element.

7. Card transport mechanism as set forth in claim 6, and a spring effective on said wedge element for rotating it through said path of card travel and yielding so as to allow the wedge element to move out of said path and allow the card to travel in said path toward said card stop.

8. Card transport mechanism as set forth in claim 5 and including means for selectively engaging and releasing said stop so as to cause the stop to be effective on a card or to allow the card to pass beyond the stop.

PO-1050
(5/69)

UNITED STATES PATENT OFFICE
CERTIFICATE OF CORRECTION

Patent No. 3,572,693 Dated March 30, 1971

Inventor(s) C. A. Larson and D. J. Wanek

It is certified that error appears in the above-identified patent and that said Letters Patent are hereby corrected as shown below:

Column 6, line 10, delete "movable" and substitute -- movably --.

Signed and sealed this 6th day of July 1971.

(SEAL)
Attest:

EDWARD M.FLETCHER,JR.
Attesting Officer

WILLIAM E. SCHUYLER,
Commissioner of Paten